US010836227B2

(12) United States Patent
Dyna

(10) Patent No.: US 10,836,227 B2
(45) Date of Patent: Nov. 17, 2020

(54) GEAR ARM ASSEMBLY

(71) Applicant: Marcin Dyna, Oak Park, IL (US)

(72) Inventor: Marcin Dyna, Oak Park, IL (US)

( * ) Notice: Subject to any disclaimer, the term of this patent is extended or adjusted under 35 U.S.C. 154(b) by 14 days.

(21) Appl. No.: 16/020,587

(22) Filed: Jun. 27, 2018

(65) Prior Publication Data
US 2019/0001772 A1    Jan. 3, 2019

Related U.S. Application Data

(60) Provisional application No. 62/525,834, filed on Jun. 28, 2017.

(51) Int. Cl.
*B60G 7/00* (2006.01)
*B62D 21/18* (2006.01)
*B62D 7/04* (2006.01)
*B60K 17/00* (2006.01)
(Continued)

(52) U.S. Cl.
CPC ................ *B60G 7/001* (2013.01); *B60K 1/00* (2013.01); *B60K 17/00* (2013.01); *B60K 17/04* (2013.01);
(Continued)

(58) Field of Classification Search
CPC ............ B60G 7/001; B60G 2200/1324; B60G 2200/1322; B60G 2204/13; B60G 5/02;
(Continued)

(56) References Cited

U.S. PATENT DOCUMENTS 1,466,121 A    2/1923 Johnston 2,725,945 A    12/1955 Beaudoux
(Continued)

FOREIGN PATENT DOCUMENTS

DE    2522542 A1    12/1976

OTHER PUBLICATIONS

International Search Report for International Application No. PCT/US2018/039840, dated Sep. 14, 2018 (3 pages).
(Continued)

*Primary Examiner* — Darlene P Condra
(74) *Attorney, Agent, or Firm* — Nixon Peabody LLP

(57) ABSTRACT

A gear arm assembly for a vehicle includes gear arm housing having a first end, a second end, and an intermediate portion, the gear arm housing from the intermediate portion to the first end defining a first arm segment, and the gear arm housing from the intermediate portion to the second end defining a second arm segment. The assembly further includes a plurality of gears meshed together in series and housed within the gear arm housing, the plurality of gears including an intermediate gear within the intermediate portion of the gear arm housing. The assembly further includes a first wheel hub connected to a first gear of the plurality of gears at the first end of the gear arm housing, and a second wheel hub connected to a second gear of the plurality of gears at the second end of the gear arm housing. The assembly further includes a primary drive shaft extending into the gear arm housing at the intermediate portion and configured to connect a drive input to the intermediate gear, a spindle housing configured to connect the gear arm assembly to the frame, and a spindle rotatably coupled to and within the spindle housing and configured to allow for rotation of the gear arm housing relative to the spindle housing.

20 Claims, 15 Drawing Sheets

(51) Int. Cl.
   *B60K 1/00* (2006.01)
   *B60K 17/04* (2006.01)
   *B60K 17/32* (2006.01)
   *B60K 17/356* (2006.01)
   *B60K 17/34* (2006.01)
   *B60K 25/02* (2006.01)
   *B60K 25/00* (2006.01)

(52) U.S. Cl.
   CPC ............ *B60K 17/043* (2013.01); *B60K 17/32* (2013.01); *B60K 17/34* (2013.01); *B60K 17/356* (2013.01); *B60K 25/02* (2013.01); *B62D 7/04* (2013.01); *B62D 21/183* (2013.01); *B60G 2200/1322* (2013.01); *B60G 2200/1324* (2013.01); *B60K 2025/005* (2013.01); *B60K 2025/026* (2013.01); *B60K 2025/028* (2013.01)

(58) Field of Classification Search
   CPC .......... B60G 2300/07; B60G 2202/413; B60G 17/0165; B60K 25/02; B60K 17/04; B60K 17/34; B60K 17/356; B60K 17/32; B60K 17/043; B60K 1/00; B60K 17/00; B60K 2025/026; B60K 2025/005; B60K 2025/028; B62D 7/04; B62D 21/183
   See application file for complete search history.

(56) References Cited

U.S. PATENT DOCUMENTS

| | | | |
|---|---|---|---|
| 3,351,037 A | 11/1967 | Meili | |
| 3,450,221 A | 6/1969 | Nelson | |
| 3,659,666 A | 5/1972 | Forsyth | |
| 4,470,475 A | 9/1984 | Carlson | |
| 4,560,018 A * | 12/1985 | Satzler | B60K 17/046 180/24.03 |
| 4,817,747 A | 4/1989 | Kopczynski | |
| 5,417,297 A * | 5/1995 | Auer | B60K 17/046 180/24.04 |
| 5,482,326 A | 1/1996 | Levi | |
| 9,493,185 B2 | 11/2016 | Dada | |
| 2004/0262070 A1* | 12/2004 | Uemura | B60B 35/001 180/378 |
| 2015/0165898 A1* | 6/2015 | Bindl | B60K 17/16 180/248 |
| 2019/0126747 A1* | 5/2019 | Andersson | B60T 1/065 |

OTHER PUBLICATIONS

Written Opinion for International Application No. PCT/US2018/039840, dated Sep. 14, 2018 (6 pages).

* cited by examiner

GEAR ARM ASSEMBLY

CROSS-REFERENCE TO RELATED APPLICATION

The present application claims the benefit of and priority to U.S. Provisional Application No. 62/525,834, filed Jun. 28, 2017, which is hereby incorporated by reference herein in its entirety.

TECHNICAL FIELD

The present disclosure relates generally to a gear arm assembly for vehicles and, more particularly, a gear arm assembly for all-terrain vehicles.

BACKGROUND

All-terrain vehicles exist that have eight wheels, with four wheels on one side and four wheels on the opposite side. These vehicles have the ability to drive all eight wheels to move the vehicle, which is referred to herein as 8-by-8 vehicles.

Some conventional 8-by-8 vehicles have all eight wheels fixed to the frame such that the wheels cannot be raised or lowered relative to each other; also referred to herein as fixed-wheeled vehicles. The wheels being fixed to the frame causes one or more of the wheels to lose contact with the ground while the 8-by-8 vehicle travels over uneven terrain. For example, as the 8-by-8 vehicle travels over an apex, the front and rear wheels on both sides of the vehicle may lose contact with the ground. As another example, as the 8-by-8 vehicle traverses a valley, the middle wheels may lose contact with the ground. The loss of contact is unwanted and affects vehicle performance.

Other conventional 8-by-8 vehicles allow for each wheel by itself to be raised and lowered independently from the other wheels, either actively under power or passively based on contact with the ground. However, these 8-by-8 vehicles can suffer from the inability to traverse certain types of uneven terrain, such as terrain that abruptly increases or decreases in elevation. As an example, a ledge or a rock face may cause an abrupt increase in elevation that these 8-by-8 vehicles may be unable to traverse.

Needs exist, therefore, for 8-by-8 vehicles, as well as vehicles in general, that maintain contact with the terrain for all of the wheels while still being able to traverse terrain of different types.

SUMMARY

In accord with aspects of the present disclosure, a gear arm assembly for a vehicle is disclosed. The gear arm assembly includes a gear arm housing having a first end, a second end, and an intermediate portion. The gear arm housing from the intermediate portion to the first end defines a first arm segment, and the gear arm housing from the intermediate portion to the second end defines a second arm segment. The assembly further includes a plurality of gears meshed together in series and housed within the gear arm housing. The plurality of gears includes an intermediate gear within the intermediate portion of the gear arm housing. The assembly further includes a first wheel hub connected to a first gear of the plurality of gears at the first end of the gear arm housing. The assembly further includes a second wheel hub connected to a second gear of the plurality of gears at the second end of the gear arm housing. The assembly further includes a primary drive shaft extending into the gear arm housing at the intermediate portion. The primary drive shaft is configured to connect a drive input of the vehicle to the intermediate gear. The assembly further includes a spindle housing configured to connect the gear arm assembly to a frame of the vehicle. The assembly further includes a spindle rotatably coupled to and within the spindle housing and configured to allow for rotation of the gear arm housing relative to the spindle housing. The assembly further includes a stabilizer arm connected to and extending up from the spindle, a shock absorber connected to a distal end of the stabilizer arm opposite from the gear arm housing, and a pneumatic cylinder connected to the distal end of the stabilizer arm. The pneumatic cylinder is configured to cause the gear arm housing to rotate relative to the spindle housing upon actuation.

In accord with aspects of the present disclosure, a vehicle is disclosed. The vehicle includes a frame, at least one power source mounted to the frame, and a drivetrain mounted to the frame and connected to the at least one power source. The vehicle further includes at least four gear arm assemblies mounted to the frame and connected to the drivetrain. Each gear arm assembly of the at least four gear arm assemblies includes a gear arm housing having a first end, a second end, and an intermediate portion. The gear arm housing from the intermediate portion to the first end defines a first arm segment, and the gear arm housing from the intermediate portion to the second end defines a second arm segment. Each gear arm assembly also includes a plurality of gears meshed together in series and housed within the gear arm housing. The plurality of gears includes an intermediate gear within the intermediate portion of the gear arm housing. Each gear arm assembly also includes a first wheel hub connected to a first gear of the plurality of gears at the first end of the gear arm housing, and a second wheel hub connected to a second gear of the plurality of gears at the second end of the gear arm housing. Each gear arm assembly also includes a primary drive shaft extending into the gear arm housing at the intermediate portion that is configured to connect the drivetrain to the intermediate gear. Each gear arm assembly also includes a spindle housing configured to connect the gear arm assembly to the frame, and a spindle rotatably coupled to and within the spindle housing and configured to allow for rotation of the gear arm housing relative to the spindle housing. The vehicle further includes a plurality of wheels. Each wheel of the plurality of wheels is connected to the first wheel hub or the second wheel hub of a separate one of the at least four gear arm assemblies. The drivetrain is configured to drive the wheels of the assemblies on a first side of the vehicle independently from the wheels of the assemblies on a second side of the vehicle, opposite from the first side.

In accord with aspects of the present disclosure, a gear arm assembly for a vehicle is disclosed. The gear arm assembly includes a gear arm housing having a first end, a second end, and an intermediate portion. The gear arm housing from the intermediate portion to the first end defines a first arm segment, and the gear arm housing from the intermediate portion to the second end defines a second arm segment. The assembly further includes a plurality of gears meshed together in series and housed within the gear arm housing. The plurality of gears includes an intermediate gear within the intermediate portion of the gear arm housing. The assembly further includes a first wheel hub connected to a first gear of the plurality of gears at the first end of the gear arm housing, and a second wheel hub connected to a second gear of the plurality of gears at the second end of the gear arm housing. The assembly further includes a primary drive shaft extending into the gear arm housing at the intermediate portion and configured to connect a drive input to the intermediate gear. The assembly further includes a spindle housing configured to connect the gear arm assembly to the frame, and a spindle rotatably coupled to and within the spindle housing and configured to allow for rotation of the gear arm housing relative to the spindle housing.

The above summary is not intended to represent every embodiment or every aspect of the present disclosure. Rather, the foregoing summary merely provides an exemplification of some of the novel aspects and features set forth herein. The above features and advantages, and other features and advantages of the present disclosure, which are considered to be inventive singly or in any combination, will be readily apparent from the accompanying drawings and the appended claim.

Figure 1A:
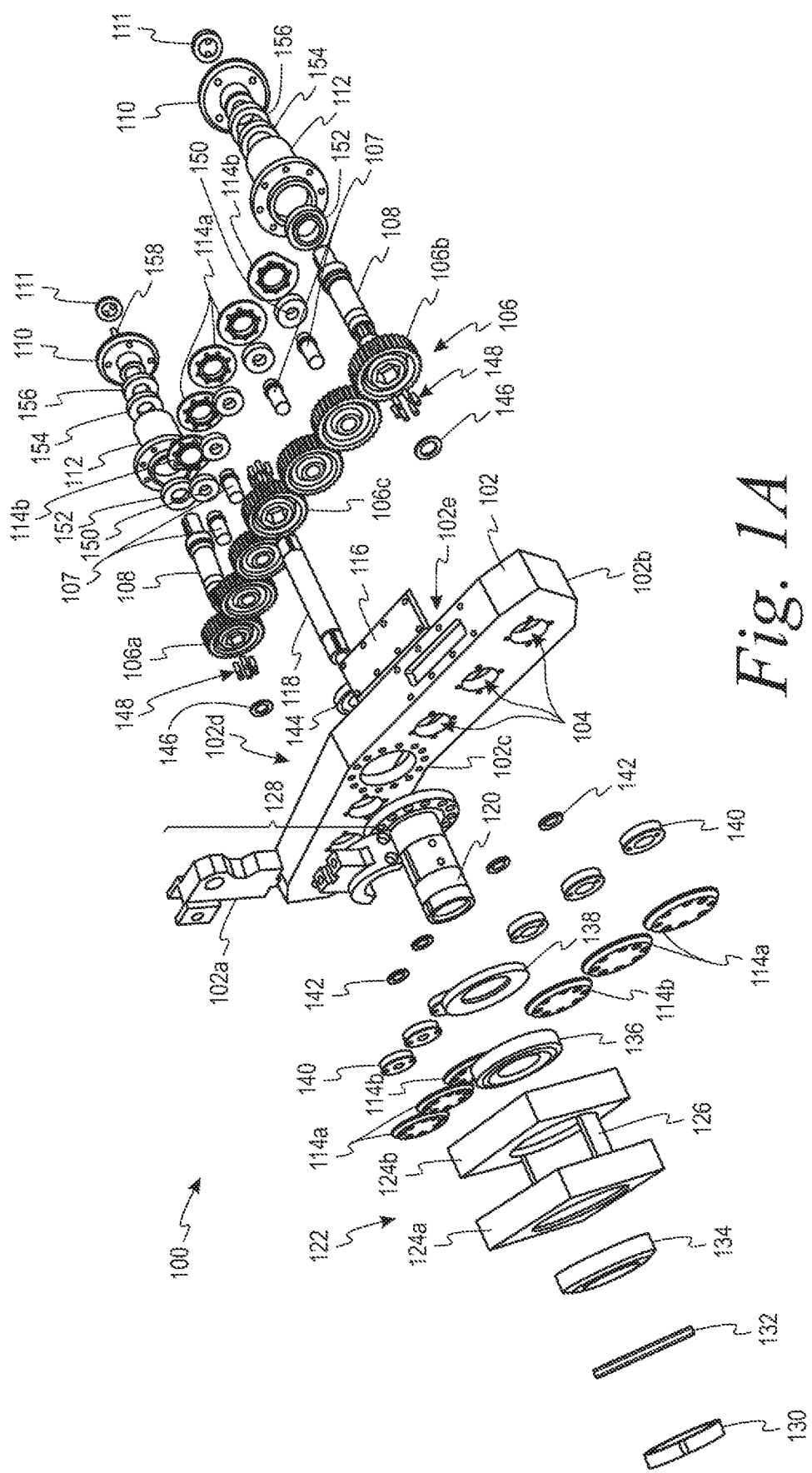
FIG. 1A shows an exploded view of an embodiment of the gear arm assembly according to aspects of the present disclosure.

The present disclosure is susceptible to various modifications and alternative forms. Though some representative embodiments have been shown by way of example in the drawings and will be described in detail herein, it should be understood that the inventive aspects described herein are not limited to the particular forms illustrated in the drawings. Rather, the disclosure is to cover all modifications, equivalents, and alternatives falling within the spirit and scope of the disclosure, as further defined by the appended claims.

DETAILED DESCRIPTION

This disclosure is susceptible of embodiment in many different forms. There are shown in the drawings, and will herein be described in detail, representative embodiments with the understanding that the present disclosure is to be considered as an exemplification of the principles of the present disclosure and is not intended to limit the broad aspects of the disclosure to the embodiments illustrated. For purposes of the present detailed description, unless specifically disclaimed or logically prohibited: the singular includes the plural and vice versa; and the words "including" or "comprising" or "having" means "including without limitation." Moreover, words of approximation, such as "about," "almost," "substantially," "approximately," and the like, can be used herein in the sense of "at, near, or nearly at," or "within 3-5% of," or "within acceptable manufacturing tolerances," or any logical combination thereof, for example."

The gear arm assembly of the present disclosure allows multi-wheeled vehicles, such as 4-by-4 vehicles, 8-by-8 vehicles, and the like, to maintain contact with the ground over which the vehicles traverse in situations where vehicles with conventional suspension systems (or lack thereof) or wheel configurations would lose contact. Further, the gear arm assembly of the present disclosure allows one or more wheels connected to the gear arm assembly to be actively raised and lowered by raising and lowering an adjacent wheel connected to the gear arm assembly, which allows the vehicle upon which the gear arm assembly is attached to traverse greater types of terrain, such as uneven terrain. Further, the gear arm assembly of the present disclosure allows vehicles to transform from, for example, 8-by-8 vehicles to 4-by-4 vehicles by raising four of the eight wheels despite all eight wheels being in constant connection with the drivetrain of the vehicle.

Figure 1B:
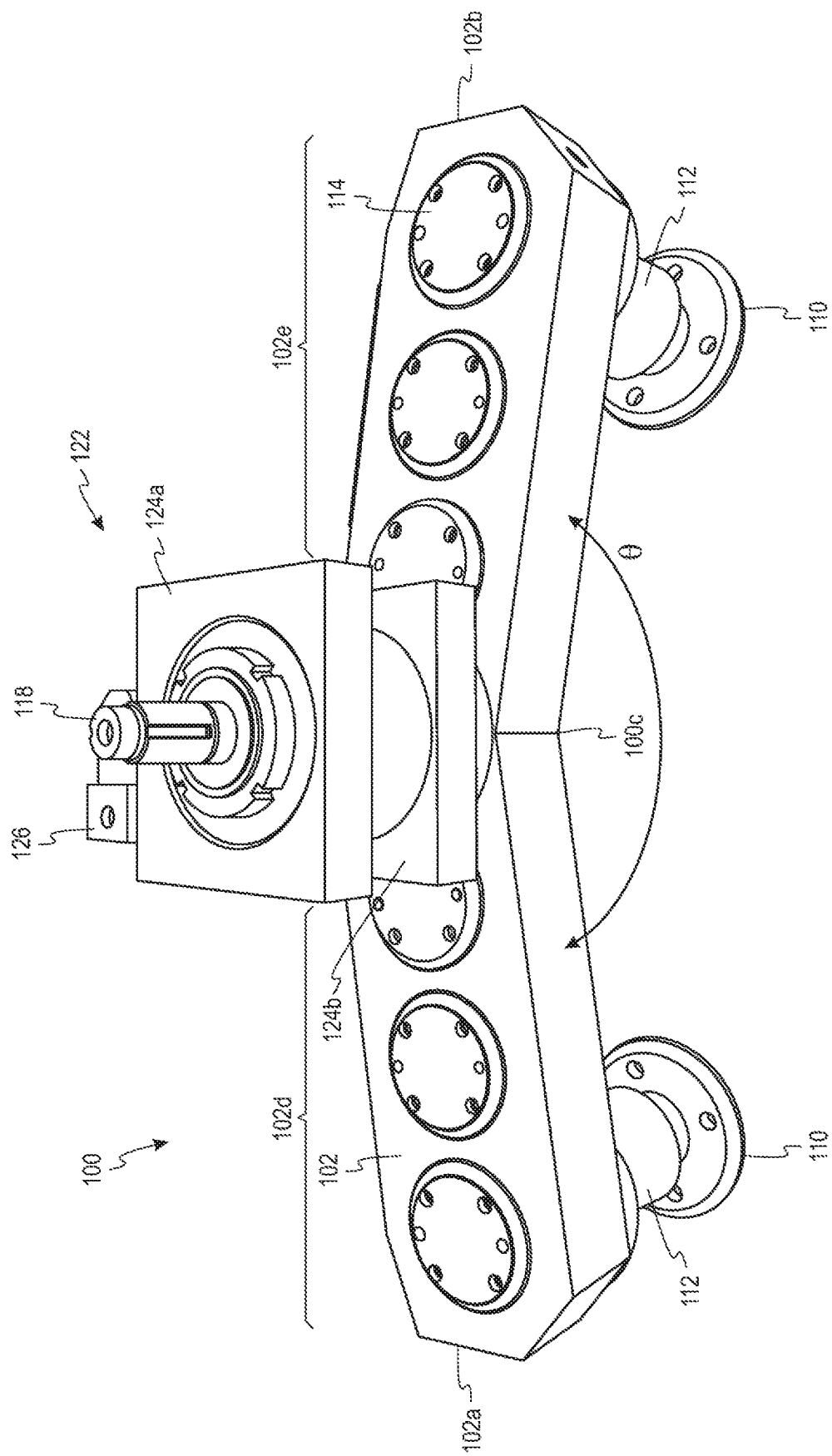
FIG. 1B shows a perspective frame-side view of the gear arm assembly of FIG. 1A according to aspects of the present disclosure.
Figure 1C:
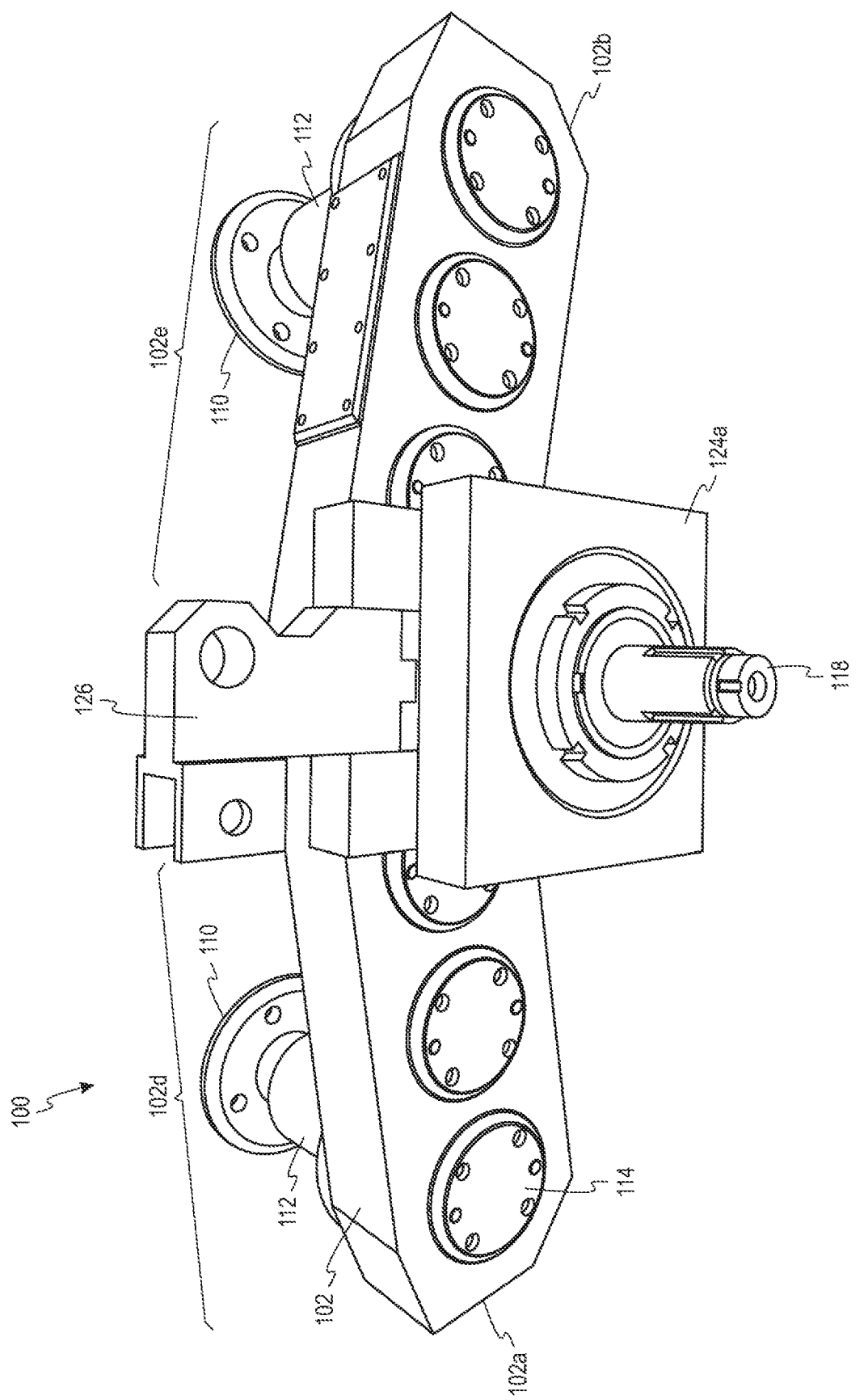
FIG. 1C shows another perspective frame side view of the gear arm assembly of FIG. 1A according to aspects of the present disclosure.
Figure 1D:
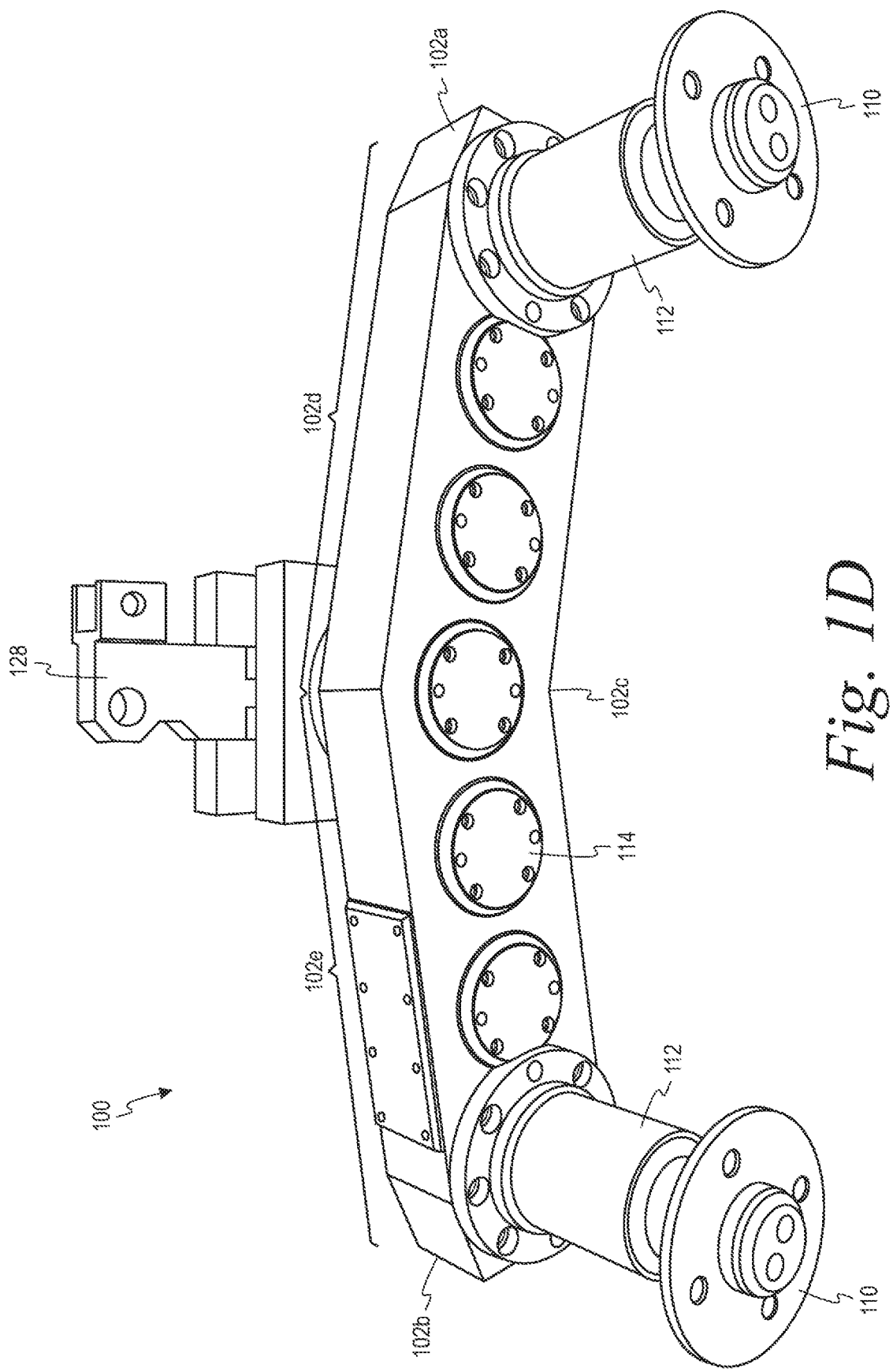
FIG. 1D shows a perspective wheel-side view of the gear arm assembly of FIG. 1A according to aspects of the present disclosure.

Referring to the figures, FIG. 1A shows an exploded view of a gear arm assembly 100 according to aspects of the present disclosure. FIG. 1B shows a perspective view of the gear arm assembly 100 according to aspects of the present disclosure. FIGS. 1C and 1D show perspective side views of the gear arm assembly of FIG. 1A from the frame side (FIG. 1C) and the wheel side (FIG. 1D) according to aspects of the present disclosure. The gear arm assembly 100 includes a gear arm housing 102. The gear arm housing 102 can be formed from a single, monolithic piece, such as by being formed from a single piece of metal or metal-alloy (e.g., such as by milling). Alternatively, the gear arm housing 102 can be formed by joining more than one piece. The gear arm housing 102 can be substantially hollow to include one or more of the components discussed below.

The gear arm housing 102 includes a first end 102a and a second end 102b. Between the ends 102a and 102b is an intermediate portion 102c. In one or more embodiments, the intermediate portion 102c can be in the middle of the gear arm housing 102. Alternatively, in one or more embodiments, the intermediate portion 102 can be closer towards one of the ends 102a, 102b than the other (e.g., not in the middle of the gear arm housing 102).

The gear arm housing 102 from the first end 102a to the intermediate portion 102c forms a first arm segment 102d, and the gear arm housing 102 from the second end 102b to the intermediate portion 102c forms a second arm segment 102e. As shown in FIG. 1B, the first arm segment 102d and the second arm segment 102e form an angle θ there between. In one or more embodiments, the angle θ can be about 120° to about 180°, or more preferably about 150° to about 170°, or more preferably about 155° to about 165°, or more preferably about 160°. The angle θ formed between the first arm segment 102d and the second arm segment 102e provides for greater clearance between the wheels attached to the assembly 100 and the frame of a vehicle upon with the assembly 100 is attached (discussed below). When attached to a vehicle, and when the vehicle is on a level surface, each arm segment 102d, 102e can be angled about 10° below horizontal. The assembly 100 can be configured to allow for about a 45° range of rotation about the intermediate point for each arm segment 102d, 102e. Thus, for example, each arm segment 102d, 102e can be rotated about 10° to become parallel horizontally and rotated an additional 35° towards the vehicle. In the opposite direction, each arm segment 102d, 102e can be rotated about 45° to be about 55° off horizontal. However, in one or more embodiments, the range or motion can be less to prevent, for example, the wheels attached to the assembly 100 from hitting the vehicle. Such ranges of motion less than 45° include, for example, about 40°, or more preferably about 35°, or more preferably about 30°, or more preferably about 25°, or even less.

The dimensions of the gear arm housing 102 can vary depending on, for example, the size of the vehicle on which the gear arm housing 102 is attached, the size of the wheels attached to the gear arm housing 102, and the like. The gear arm housing 102 includes apertures 104 (FIG. 1A) through at least one side that access the interior of the gear arm housing 102. Alternatively, the gear arm housing 102 can include apertures 104 within at least one side and an opposite side. The apertures 104 can be aligned with a plurality of gears 106 within the gear arm housing 102 that rotate around sub shafts 107. As shown in FIG. 1A, the assembly 100 can include seven gears 106. However, the number of gears 106 can vary without departing from the spirit and scope of the present disclosure, such as having less than 7 gears (e.g., 3 gears or 5 gears) or having more than 7 gears (e.g., 9 gears, 11 gears, etc.). The gears 106 are meshed together in series within the first arm segment 102d and the second arm segment 102e. In one or more embodiments, the centers of the gears 106 within the first arm segment 102d can be aligned along a straight line, and the centers of the gears 106 within the second arm segment 102e can be aligned along a straight line. However, in one or more embodiments and depending on the sizes of the gears 106 relative to the gear arm housing 102 and relative to each other, the centers of the gears 106 can be offset, such as not in a straight line within each arm segment 102d, 102e.

The gears 106 include a first end gear 106a at the end of the first end 102a of the gear arm housing 102, and a second end gear 106b at the end of the second end 102b of the gear arm housing 102. The gears 106 also include an intermediate gear 106c at the intermediate portion 102c of the gear arm housing 102.

In one or more embodiments, the gears 106 can be the same size. Alternatively, in one or more embodiments, the gears 106 can have varying sizes, such as the intermediate gear 106c being larger or smaller than the first end gear 102a, the second end gear 102, and/or the gears there between. In one embodiment, the gears 106 can have about 40 teeth. However, the number of teeth can be more or less without departing from the spirit and scope of the present disclosure. In one or more embodiments, the gear ratio between all of the gears 106 can be 1:1. Alternatively, the gear ratios can vary by increasing or decreasing the mechanical advantage between gears 106.

Connected to the end gears 106a and 106b are half shafts 108. The half shafts 108 connect the end gears 106a and 106b to wheel hubs 110 and wheel hub covers 111. The lengths of the half shafts 108 provide clearance for wheels connected to the gear arm assembly at the half shafts 108. The wheel hubs 110 connect wheels (not shown) to the assembly 100. The half shafts 108 can be supported within half shaft housings 112 that span from the gear arm housing 102 to about the wheel hubs 110. The configuration shown in FIGS. 1A-1D allows for two wheels. However, in one or more embodiments, more than two wheels can be connected to the assembly 100. For example, in one or more embodiments, the intermediate gear 106c can be connected to a half shaft, and the half shaft can be connected to a wheel hub. Thus, the resulting assembly can have three wheels connected thereto. However, to have all three wheels spin in the same direction, the number of gears 106 can be varied, such as by having only five gears 106, when the intermediate gear 106c also is connected to a wheel.

Referring back to the apertures 104, the gear arm housing 102 can include gear arm covers 114 that close off the apertures 104. The gear arm covers 114 can be removable to access the interior of the gear arm housing 102. The gear arm covers 114 can include circular gear arm covers 114a and moon covers 114b. The moon covers 114b have cutout portions to provide for clearance with, for example, the spindle 120 on the vehicle side of the gear arm housing 102 and the half shaft housings 112 on the tire side of the gear arm housing 102. The gear arm housing 102 can also include a gear arm housing cover 116 that can be removable. The gear arm housing cover 116 allows access to the interior of the gear arm housing 102 to, for example, fill the gear arm housing 102 with oil or some other lubricant to allow for a smooth rotation of the gears 106.

Connected to the intermediate gear 106c is a primary drive shaft 118. The primary drive shaft 118 is rotated by one or more elements of the vehicle (e.g., drivetrain) upon which the assembly 100 is attached (not shown) to cause the gears 106 and ultimately the wheels to rotate and drive the vehicle. The primary drive shaft 118 connects to the intermediate gear 106c within the gear arm housing 102 and extends out of the gear arm housing 102 to connect to the vehicle. The connection of the primary drive shaft 118 to the gears 106 allows for a fine control over the wheels connected to the assembly 100 as opposed to, for example, a pulley and/or belt assemblies. That is, the gears 106 can be configured and assembled to have little to no play between each gear 106 to allow for fine control over the gears 106 within the assembly 100 by the primary drive shaft 118. The fine control allows for smoother transitions, for example, between forward and reverse driving and turning. The gears 106 also prevent lag between inputs that pulley and/or belt driven assemblies may suffer from.

In one or more embodiments, the portion of the primary drive shaft 118 that extends out of the gear arm housing 102 sits within and is surrounded by a spindle 120. One end of the spindle 120 can be connected to the gear arm housing 102 by a mechanical fastener (e.g., bolts, screws, welding, etc.). The other end of the spindle 120 can be free to rotate the gear arm housing 102 relative to the frame of a vehicle.

The spindle 120 can be housed within a spindle housing 122 within the assembly 100. The spindle housing 122 connects to the frame (not shown) of the vehicle. In particular, the spindle housing 122 can include plates 124a and 124b. Both of the plates 124a and 124b can be connected to the frame of the vehicle. Alternatively, only one of the plates 124a and 124b may be connected to the frame. Alternatively, in one or more embodiments, the spindle housing 122 can include only one of the plates 124a and 124b.

Between the plates 124a and 124b can be a surface 126. The spindle 120 sits within and is supported by the surface 126. The spindle housing 122 allows the gear arm housing 102 to rotate relative to the vehicle upon which the assembly 100 is connected. Optionally, in one or more embodiments, a stabilizer arm 128 can be connected to and extend radially away from the spindle 120. The stabilizer arm 128 can extend from the spindle 120 between the plates 124a and 124b. The stabilizer arm 128 allows one or more devices to be connected to the gear arm housing 102 to rotate the gear arm housing 102 relative to the vehicle, as discussed further below.

In one or more embodiments, the gear arm assembly 100 can freely rotate relative to the vehicle upon which the gear arm assembly 100 is attached based on gravity and the wheels connected to the gear arm assembly 100 remaining in contact with the ground upon which the vehicle sits. This type of rotation can be referred to as a passive rotation because it is caused by the terrain and the weight of the vehicle. Alternatively, in one or more embodiments, the gear arm assembly 100 can include one or more additional components that cause the gear arm assembly 100 to rotate relative to the vehicle. This type of rotation can be referred to as an active rotation because one or more components of the assembly can cause an active rotation of the gear arm housing 102 relative to the frame of the vehicle.

As illustrated in FIG. 1A, the gear arm assembly 100 can include additional components. One or more of these components can be removed or replaced with a different component without departing from the spirit and scope of the present disclosure. Thus, although these additional components are illustrated and described below, the illustration and description are for explanation purposes only and are not limiting. The additional components are included merely in one specific embodiment of the gear arm assembly 100.

As shown, the gear arm assembly 100 can include a lock nut 130 and a taper bearing 134 that sandwich a single seal plate 132. The single seal plate 132 seals off the inside of a vehicle on which the gear arm assembly 100 is attached. The single seal plate 132 can include a single seal, such as a single O-ring. The O-ring sits within a single groove along the circumference of the plate 132. However, additional O-rings can be included without departing from the spirit and scope of the present disclosure. On the other side of the spindle housing 122 is another taper bearing 136. The taper bearing 136 abuts against a double seal plate 138. The double seal plate 138 can include two seals, such as two O-rings. The double seal plate 138 can also include a third O-ring that is on the face of the double seal plate 138 that faces the frame of the vehicle. The two O-rings sit inside adjacent grooves along the circumference of the plate 138. However, additional O-rings can be included without departing from the spirit and scope of the present disclosure.

The gear arm assembly 100 also includes ball bearings 140 and 144 that interface with the gears 106 to assist the gears 106 with smoothly rotating within the gear arm housing 102. Spacers 142 and 146 also interface with the ball bearings 140 and 144 and the gears 106 to allow for proper spacing of the gears 106 within the gear arm housing 102, such as to prevent wear of the gears 106 against the inner walls of the gear arm housing 102. Ball bearings 150 also are placed on the outside of the gears 106 to assist the gears 106 with smoothly rotating within the gear arm housing 102.

Gear keys 148 interface with the end gears 106a and 106b and the intermediate gear 106c to secure the gears 106a, 106b, and 106c within the gear arm housing 102 and to the half shafts 108 for the ends gears 106a and 106b and the primary drive shaft 118 for the intermediate gear 106c.

At the interface of the half shafts 108 and the half shaft housings 112 are sets of two taper bearings 152 and 154. Beyond the taper bearings 154, on the tire side of the gear arm assembly 100, are double seals 156. The double seals 156 aid in sealing off the internal components of the gear arm assembly 100. Beyond the double seals 156 and the wheel hubs are hub keys 158, which interface with the wheel hub covers 111.

Figure 1E:
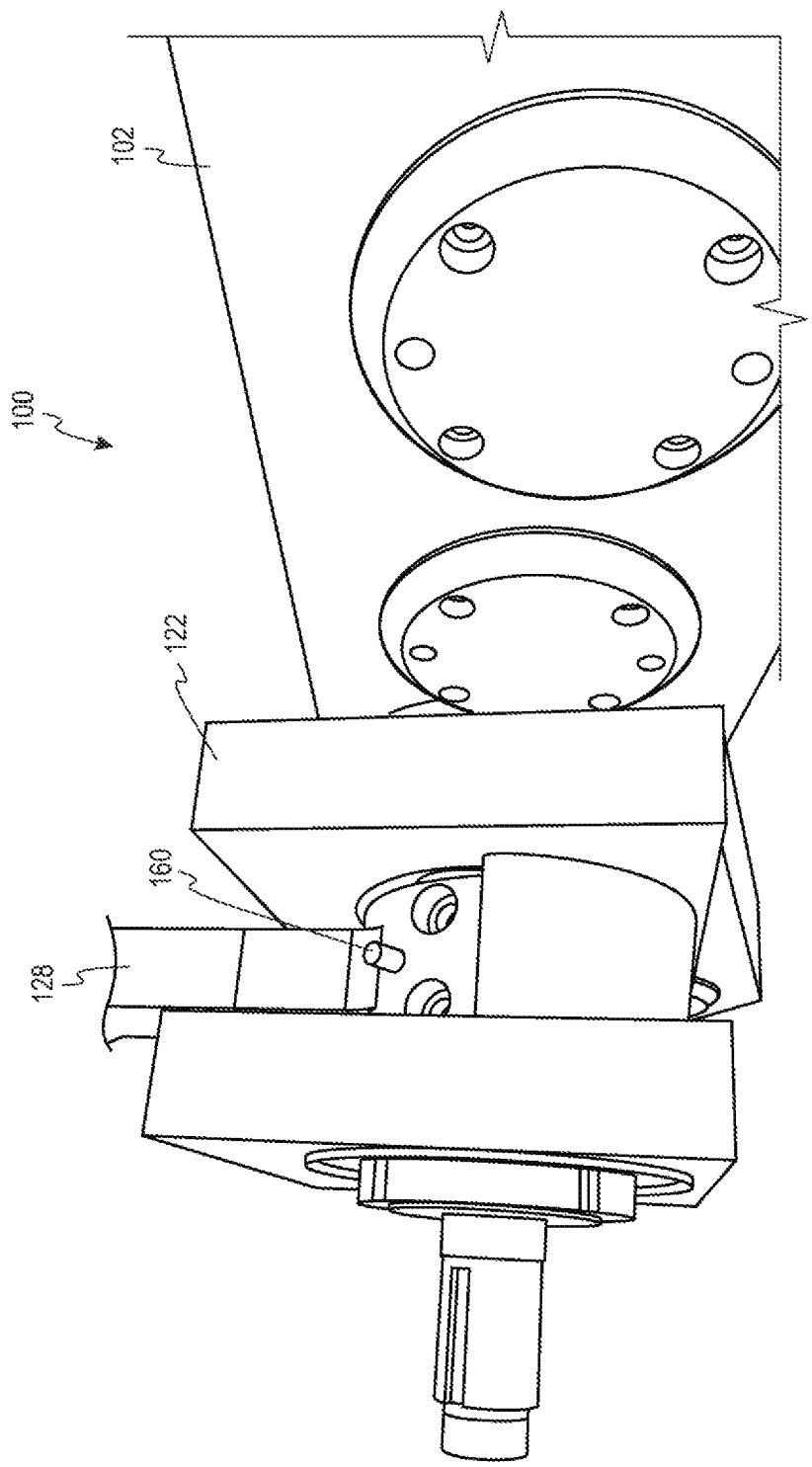
FIG. 1E shows a perspective view of a decompression tube on the stabilizer arm on the gear arm assembly of FIG. 1A according to aspects of the present disclosure.

Referring to FIG. 1E, pressure changes within the gear arm assembly 100 caused by, for example, atmospheric temperature changes and/or temperature changes associated with friction and wear can be relieved. In one or more embodiments, the stabilizer arm 128 can include a decompression tube 160. The decompression tube 160 allows for the relief of pressure that can build up within the interior of the gear arm assembly 100. The decompression tube 160 also allows for relief of a vacuum or negative pressure (as compared to atmospheric pressure) from building up by allowing air to enter into the gear arm assembly 100. A line (not shown) can be connected to the decompression tube 160. The line can extend to a protected area, such as inside a vehicle on which the gear arm assembly 100 is attached. The line allows for the output of gas (e.g., air) from the decompression tube 160 or the input of gas (e.g., air) into the decompression tube 160 to control the pressure within the gear arm assembly 100.

Figure 2A:
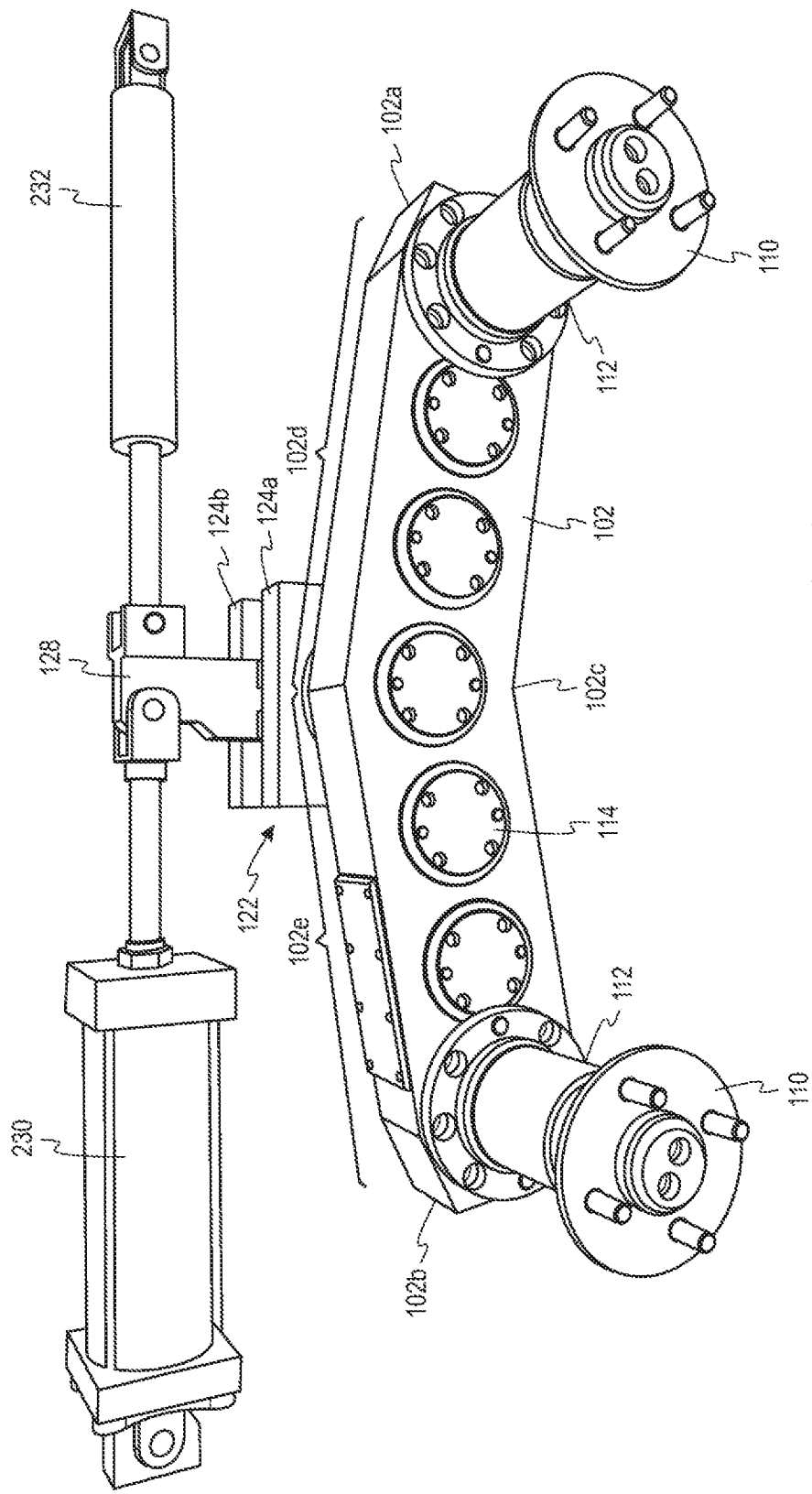
FIG. 2A shows a perspective wheel-side view of a gear arm assembly according to aspects of the present disclosure.
Figure 2B:
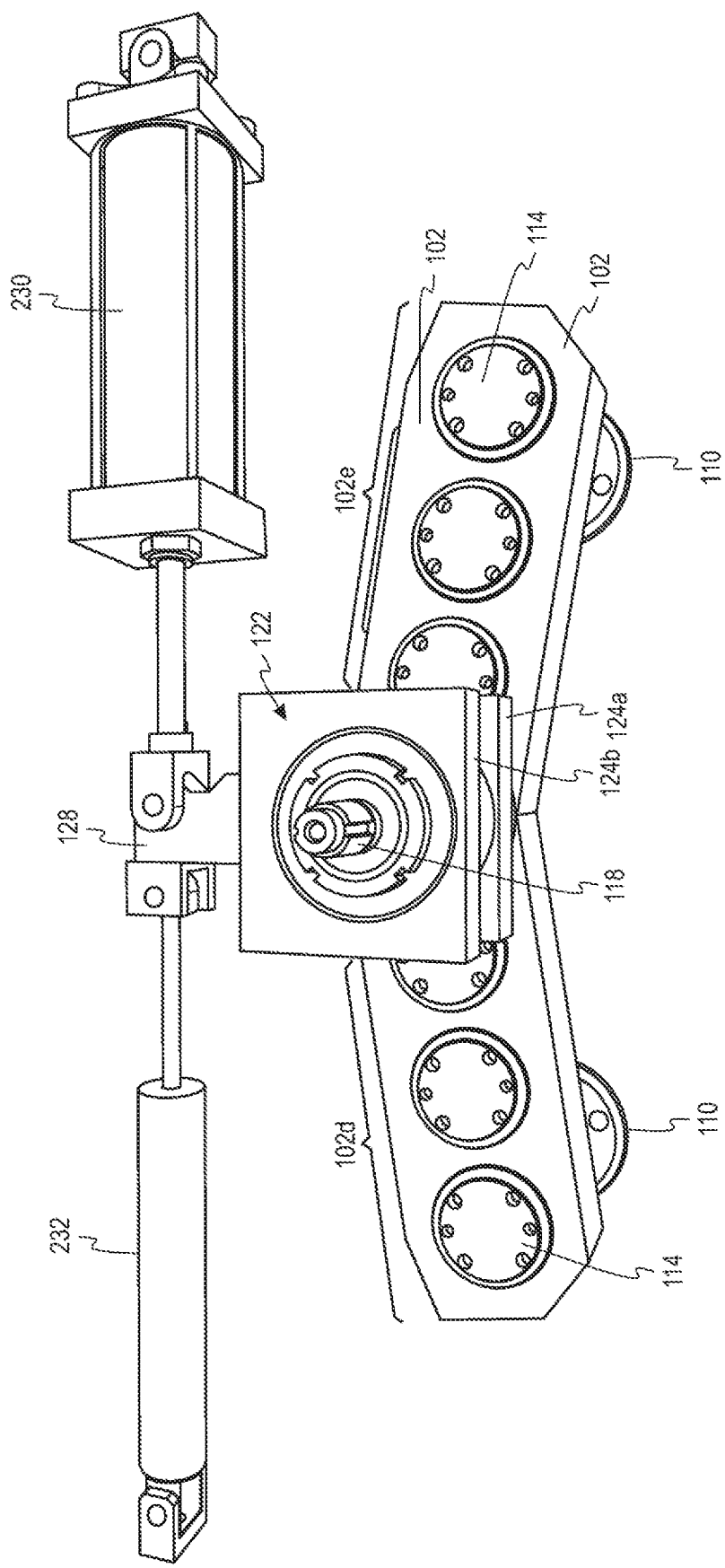
FIG. 2B shows a perspective frame-side view of the gear arm assembly of FIG. 2A according to aspects of the present disclosure.

FIG. 2A shows a wheel-side view, and FIG. 2B shows a frame-side view, of a gear arm assembly 200 configured to cause the gear arm housing 102 to actively rotate about the vehicle (not shown) upon with the assembly 200 is attached. For ease of explanation, similar features of the assemblies 100 and 200 have identical numbers. Connected to the stabilizer arm 128 is a cylinder 230. The cylinder 230 can be any type of cylinder 230 capable of moving the stabilizer arm 128, such as a hydraulic cylinder, a pneumatic cylinder, and the like. The piston size of the cylinder 230 can be, for example, 4 inches, 6 inches, or more in diameter depending on the size of the assembly 200 and the vehicle upon which the cylinder 230 is attached. Actuation of the cylinder 230 causes the stabilizer arm 128 to rotate the gear arm housing 102. As described in greater detail below, the cylinder 230 allows the gear arm assembly 200 to actively follow the contours of the ground upon which the vehicle is operating. Further, the cylinder 230 allows one of the two wheels connected to the assembly 200 to be lifted off the ground while pivoting the assembly 200 around the wheel remaining connected to the ground. Lifting a wheel off the ground allows the vehicle to be driven temporarily with fewer wheels contacting the ground, such as four wheels rather than eight. Additionally, lifting a wheel off of the ground, or at least causing the wheel to not follow the contours of the ground, allows a vehicle to cross over an obstacle on the ground, such as a ravine, that the vehicle would otherwise not be able to traverse.

Control over the cylinder 230 can be manual or automatic. In the case of manual control, an operator of the vehicle can manually control actuation of the cylinder 230 through one or more control interfaces. In the case of automatic control, one or more sensors located on the vehicle can provide one or more inputs into a controller. The controller can then control the cylinder 230 based on the one or more inputs and one or more control algorithms. The one or more inputs correlate to one or more actuations of the cylinder 230 that allow the vehicle to traverse the ground. In one or more embodiments, the control can be switched between automatic and manual control.

In one or more embodiments, the cylinder 230 is preferably a pneumatic cylinder. The air within a pneumatic cylinder can be compressed whereas, for example, hydraulic liquid (e.g., hydraulic oil) of a hydraulic cylinder cannot be compressed. By being compressible, the air within the pneumatic cylinder acts as a damper and dampens shocks transmitted from the wheels to the frame of the vehicle. The pneumatic cylinder can smooth out the ride of the vehicle without additional suspension components, such as springs, within the assembly 200 or attaching the assembly 200 to the vehicle.

In one or more embodiments, the cylinder 230 can instead be any type of actuator or motor that allows a rod or other mechanical element to rotate the stabilizer arm 128 relative to the vehicle about the spindle 120. For example, the cylinder 230 can be an electric motor, an actuator, and the like.

The assembly 200 also can include one or more shock absorbers 232. The shock absorber 232 can be any type of mechanical, hydraulic, or pneumatic damper that can absorb shock imparted onto the assembly 200. If the assembly 200 includes more than one shock absorber 232, the multiple shock absorbers 232 can be attached in series or in parallel to each other.

Figure 3A:
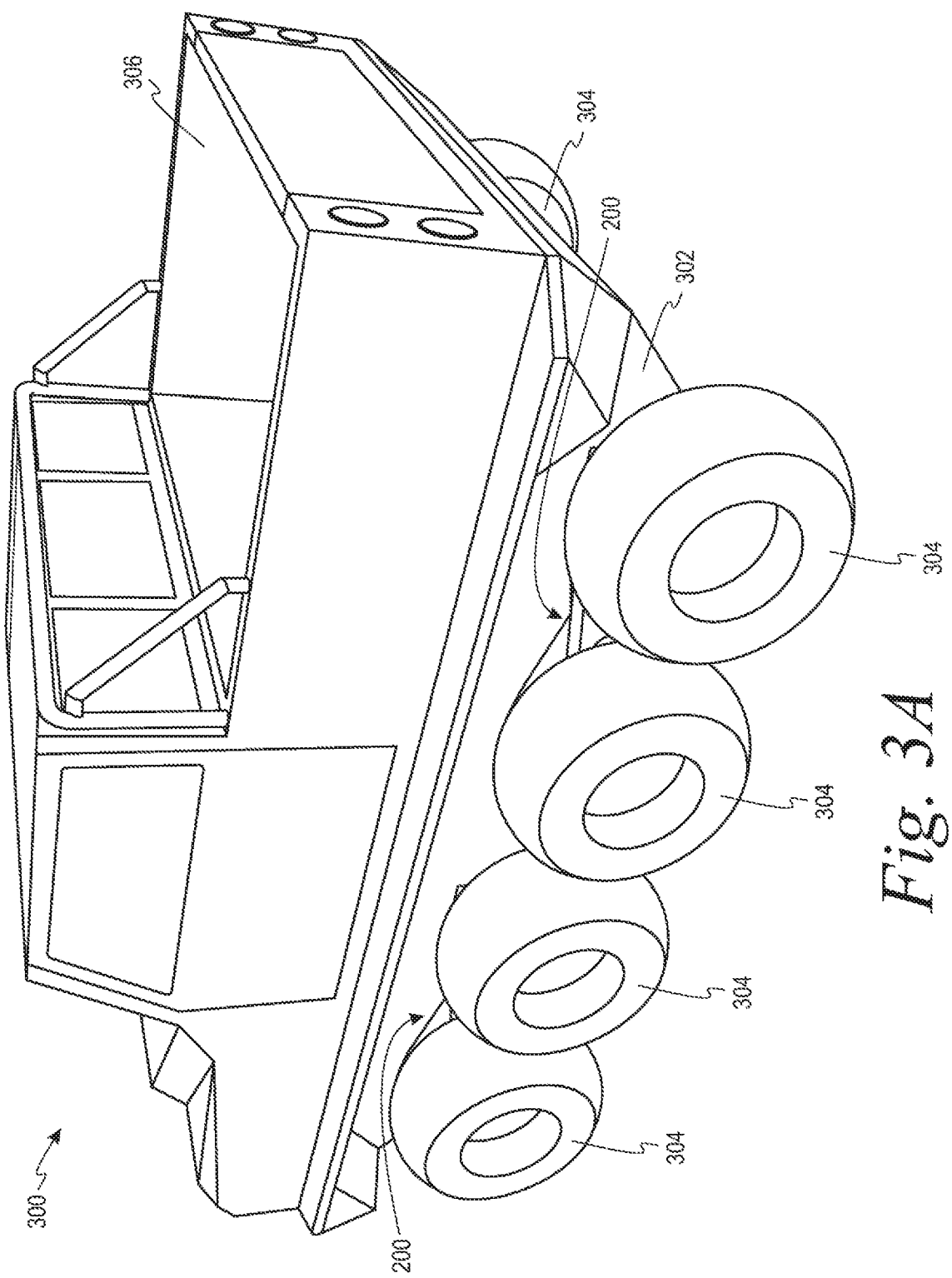
FIG. 3A shows a perspective view of a vehicle (e.g., an 8-by-8 vehicle) including multiple gear arm assemblies according to aspects of the present disclosure.
Figure 3B:
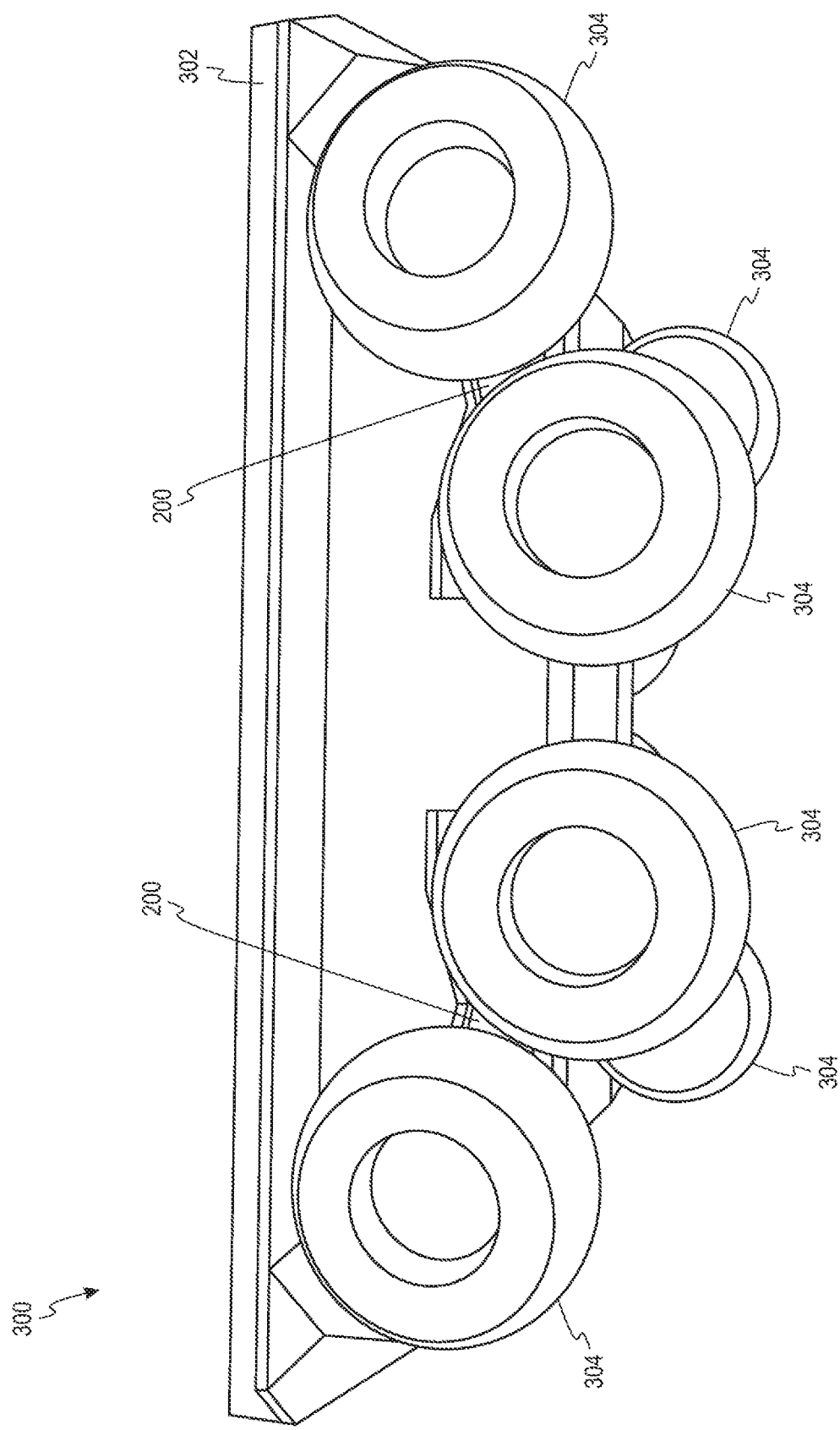
FIG. 3B shows a perspective view of the vehicle of FIG. 3A with wheels attached according to aspects of the present disclosure.

FIGS. 3A-3G show a vehicle 300 with multiple gear arm assemblies 200 connected to a frame 302 upon which a vehicle body 306 sits, in accord with aspects of the present disclosure. As shown in FIG. 3A, the frame 302 has attached four of the gear arm assemblies 200. As shown in FIG. 3B, a pair of wheels 304 can be attached to each of the gear arm assemblies 200. Thus, the vehicle 300 can be an eight-wheeled vehicle, such as an 8-by-8 vehicle. In one or more embodiments, the cylinders 230 and the shock absorbers 232 can be within and concealed by the frame 302 of the vehicle 300, as shown in FIG. 3B. However, in one or more embodiments, the cylinders 230 and/or the shock absorbers 232 can instead be exposed on the outside of the frame 302. Each cylinder 230 of the gear arm assemblies 200 can be connected to the frame 302 at one end and to a stabilizer arm 128 of an assembly 200 at the other end. Similarly, each shock absorber 232 of the gear arm assemblies 200 can be connected to the frame 302 at one end and to a stabilizer arm 128 of an assembly 200 at the other end.

FIG. 3B shows the wheels 304 in a level or flat orientation. The wheels 304 can be in this orientation if, for example, the ground upon which the vehicle 300 is sitting on is flat relative to the length of the vehicle 300, such as being flat in a level, pitched up, or pitched down orientation. FIGS. 3C-3G show the eight wheels 304 in different angled orientations relative to the frame 302 of the vehicle 300.

Figure 3C:
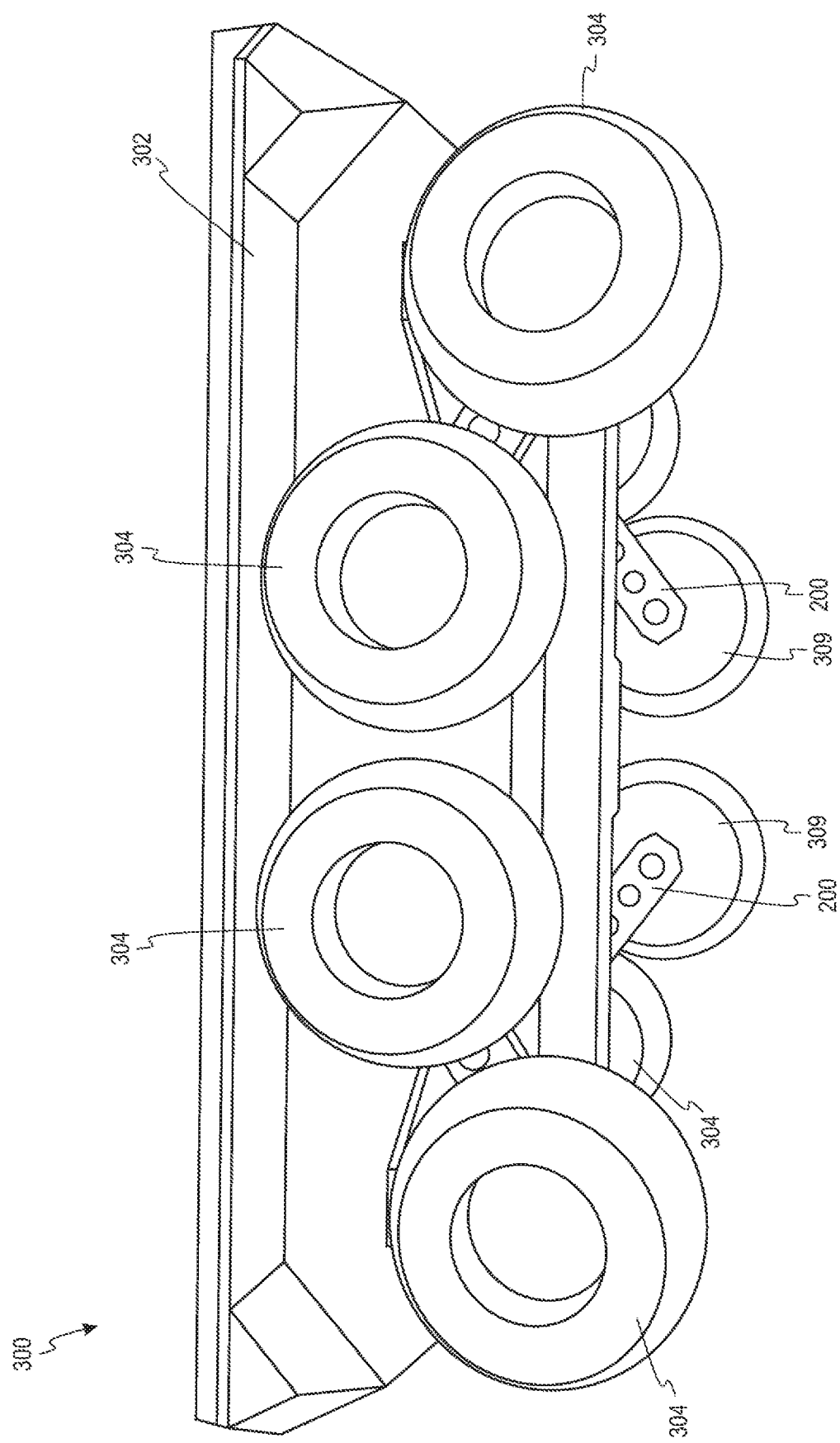
FIG. 3C shows a side view of the frame of the vehicle of FIG. 3A with the wheels in a first orientation according to aspects of the present disclosure.

FIG. 3C shows the wheels 304 in a first orientation, also referred to as an angled-in orientation because the wheels 304 for both of the assemblies 200 on each side of the vehicle 300 are angled up and toward the center of the vehicle 300. The wheels 304 can be in the first orientation (e.g., angled-in) when the vehicle 300 is traversing the top of a hill or an apex in the terrain.

Figure 3D:
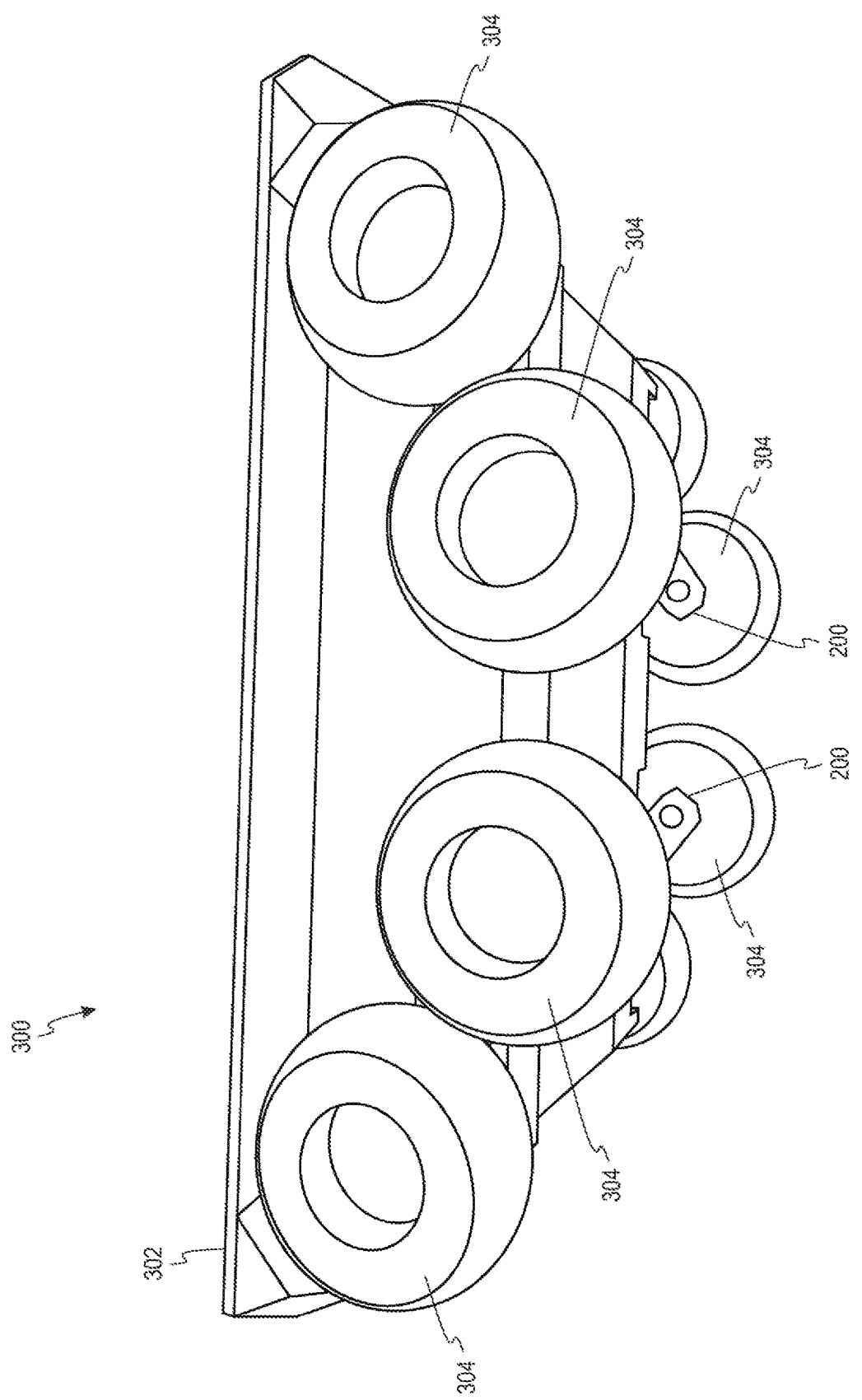
FIG. 3D shows a side view of the frame of the vehicle of FIG. 3A with the wheels in a second orientation according to aspects of the present disclosure.

FIG. 3D shows the wheels 304 in a second orientation, also referred to as an angled-out orientation because the wheels 304 for both of the assemblies 200 on each side of the vehicle 300 are angled down and away from the center of the vehicle 300. The wheels 304 can be in the second orientation (e.g., angled-out) when the vehicle 300 is traversing a small valley or dip in the terrain.

Figure 3E:
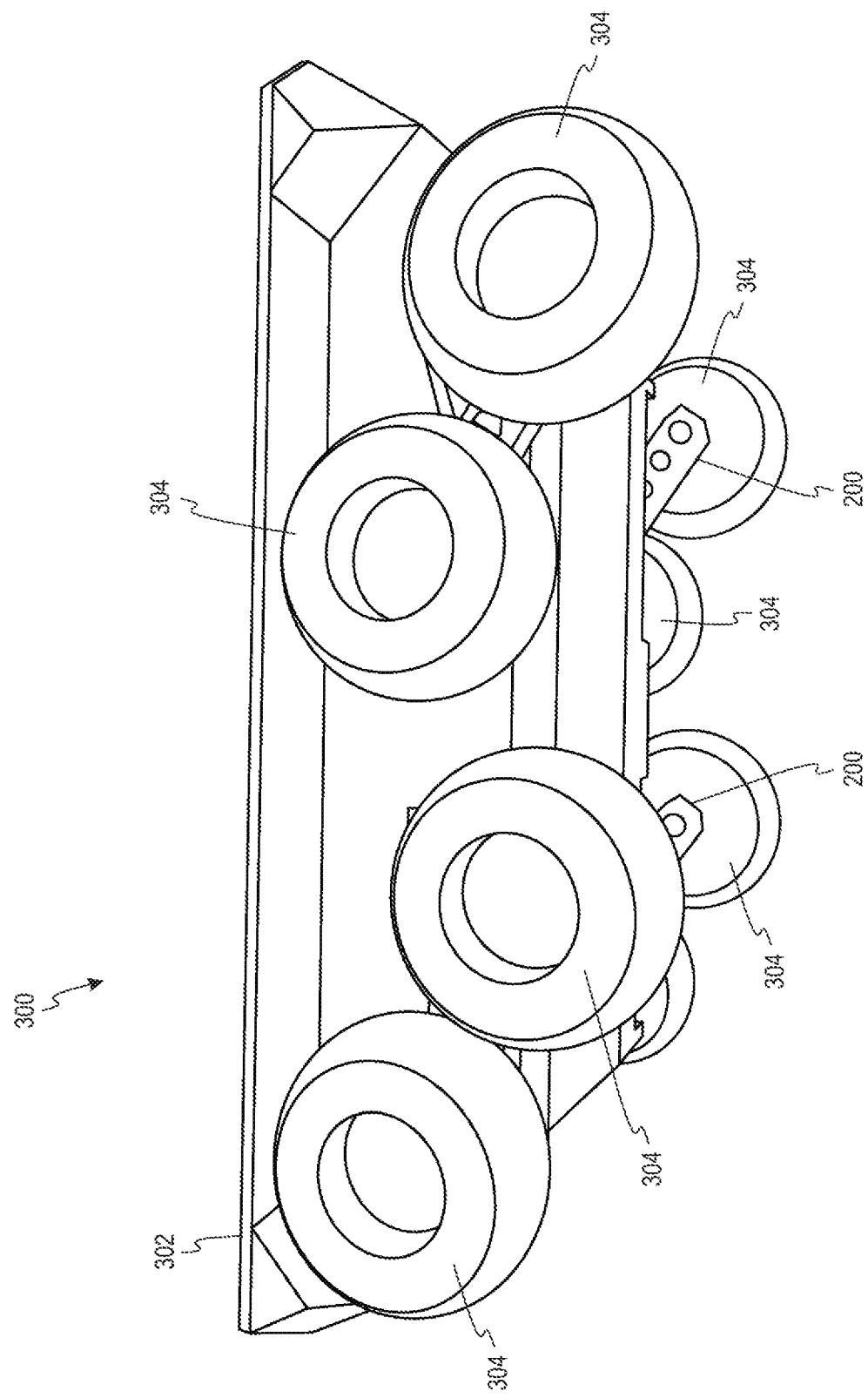
FIG. 3E shows a side view of the frame of the vehicle of FIG. 3A with the wheels in a third orientation according to aspects of the present disclosure.

FIG. 3E shows the wheels 304 in a third orientation, with both the front and rear wheels being angled in the same direction, such as toward the front (e.g., left in FIG. 3E) of the vehicle 300.

Figure 3F:
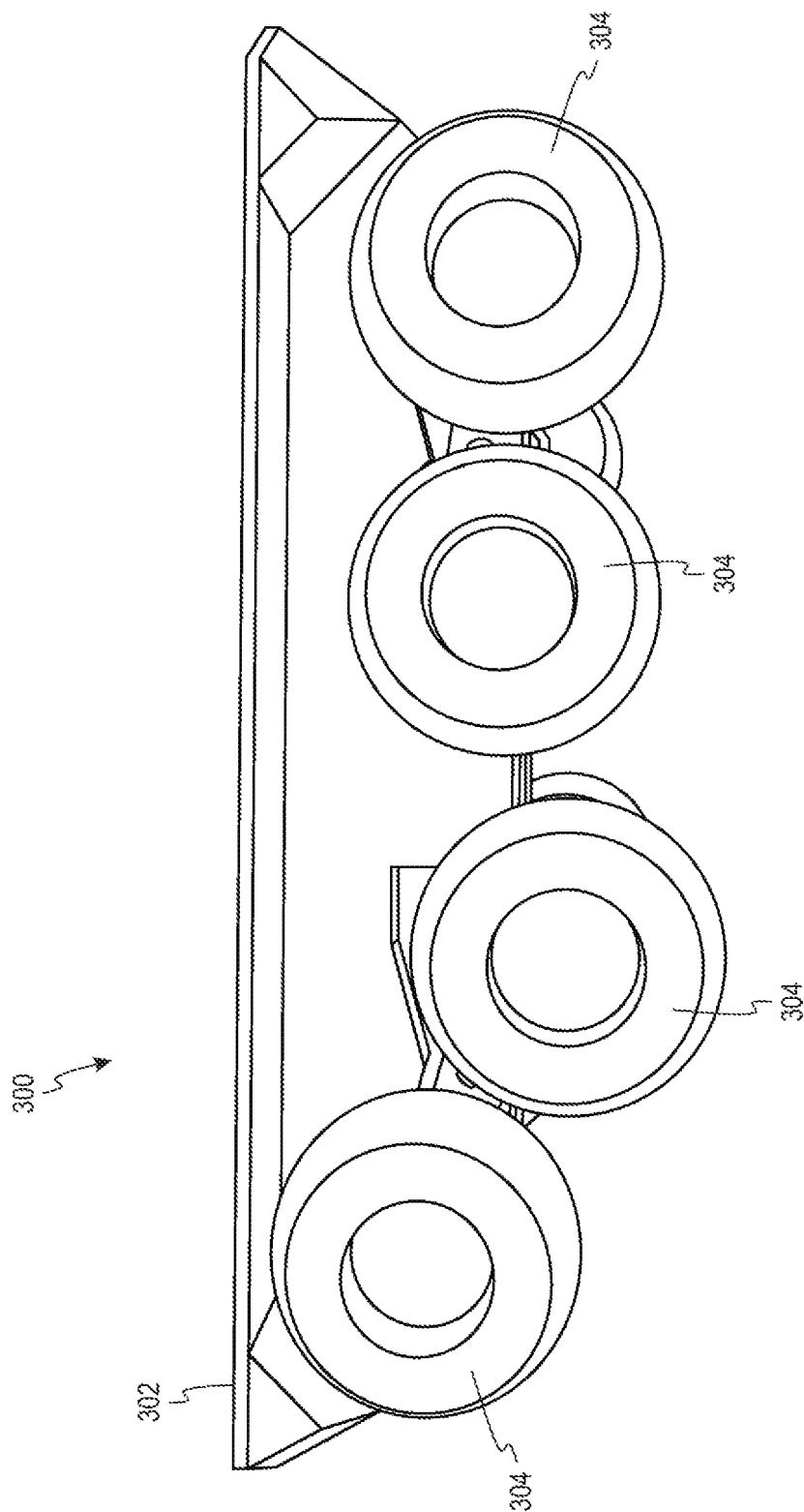
FIG. 3F shows a side view of the frame of the vehicle of FIG. 3A with the wheels in a fourth orientation according to aspects of the present disclosure.
Figure 3G:
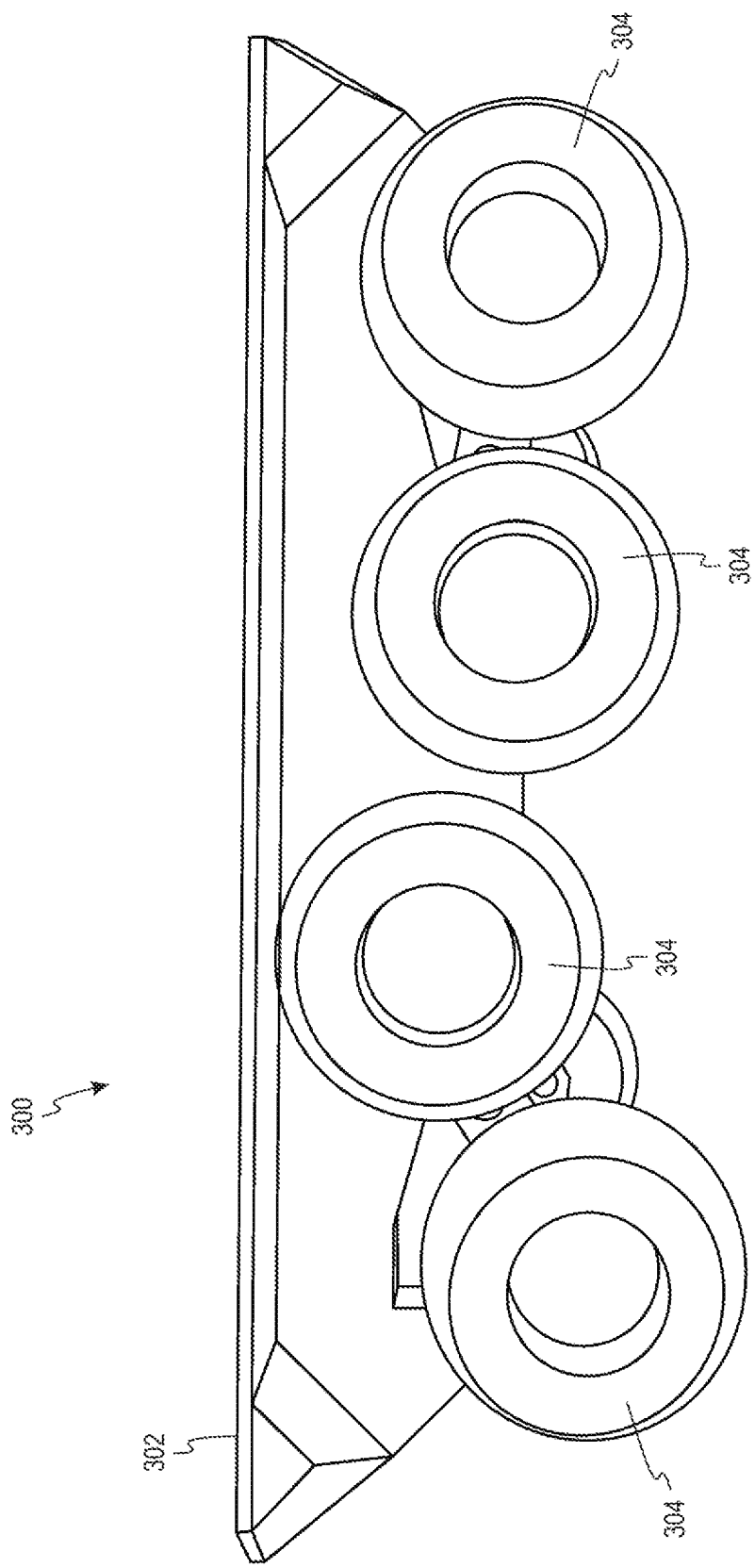
FIG. 3G shows a side view of the frame of the vehicle of FIG. 3A with the wheels in a fifth orientation according to aspects of the present disclosure.

In some arrangements, not all of the wheels 304 need to be angled relative to the frame 302. For example, FIG. 3F shows the wheels 304 in a fourth orientation, with the front wheels angled out (e.g., toward the front) and the rear wheels being level relative to the frame 302. As another example, FIG. 3G shows the wheels 304 in a fifth orientation, with the front wheels angled in (e.g., toward the rear) and the rear wheels being level relative to the frame 302.

In passive configurations described above, the wheels 304 can passively attain the positions shown in FIGS. 3A-3G based on their contact with terrain of varying shapes and the weight of the vehicle 300. However, with the addition of the cylinders 230 within the gear arm assemblies 200, the wheels 304 can be positioned actively according to the shown orientations, or somewhere there between, based on the actuation of the cylinders 230 despite the terrain being a different shape. For example, the wheels 304 can be positioned according to the first through third orientations shown in FIGS. 3C-3E so that only half of the wheels 304 are in contact with the terrain. These orientations effectively make the 8-by-8 vehicle drive like a 4-by-4 vehicle by having only four wheels in contact with the ground. The fourth and fifth orientations shown in FIGS. 3F and 3G allow for active control over the positions of the wheels 304 to traverse terrain having abrupt elevation changes. For example, the fourth orientation in FIG. 3F allows a vehicle 300 to traverse an increase in the elevation of the terrain by causing the front wheel to be lifted relative to the rear wheel on the same assembly 200. The fifth orientation in FIG. 3G allows a vehicle 300 to traverse a decrease in the elevation of the terrain by causing the front wheel to be lowered relative to the rear wheel on the same assembly 200. In the fourth and fifth orientations, the rear assemblies 200 can also be angled relative to the vehicle to maintain contact with the terrain by all of the wheels 304 attached thereto despite the front assemblies 200 being angled.

Depending on the arrangement of the frame 302, the cylinders 230, and the stabilizer arms 128, the cylinders 230 can either be in an extended arrangement or a retracted arrangement (or somewhere there between) to achieve the shown arrangements.

As discussed above, the assemblies 200 allow for one or more of the wheels 304 to be lifted off the ground to convert, for example, an 8-by-8 vehicle to a 4-by-4 vehicle. Moreover, with the cylinders 230 of the assemblies 200 being pneumatic cylinders, the compressed air within the cylinders 230 provides shock resistance as compared to, for example, hydraulic cylinders. Different wheels can be lifted off the ground for different situations and terrain. To present a wide wheelbase, the middle four wheels of an 8-by-8 vehicle can be lifted off the ground. To present a narrow wheelbase, the front and rear wheels of an 8-by-8 vehicle can be lifted off the ground. To present a wheelbase between the wide and narrow bases, the front or rear wheels and one set of middle wheels, not adjacent to either the lifted front or rear wheels can be lifted off the ground.

Figure 4:
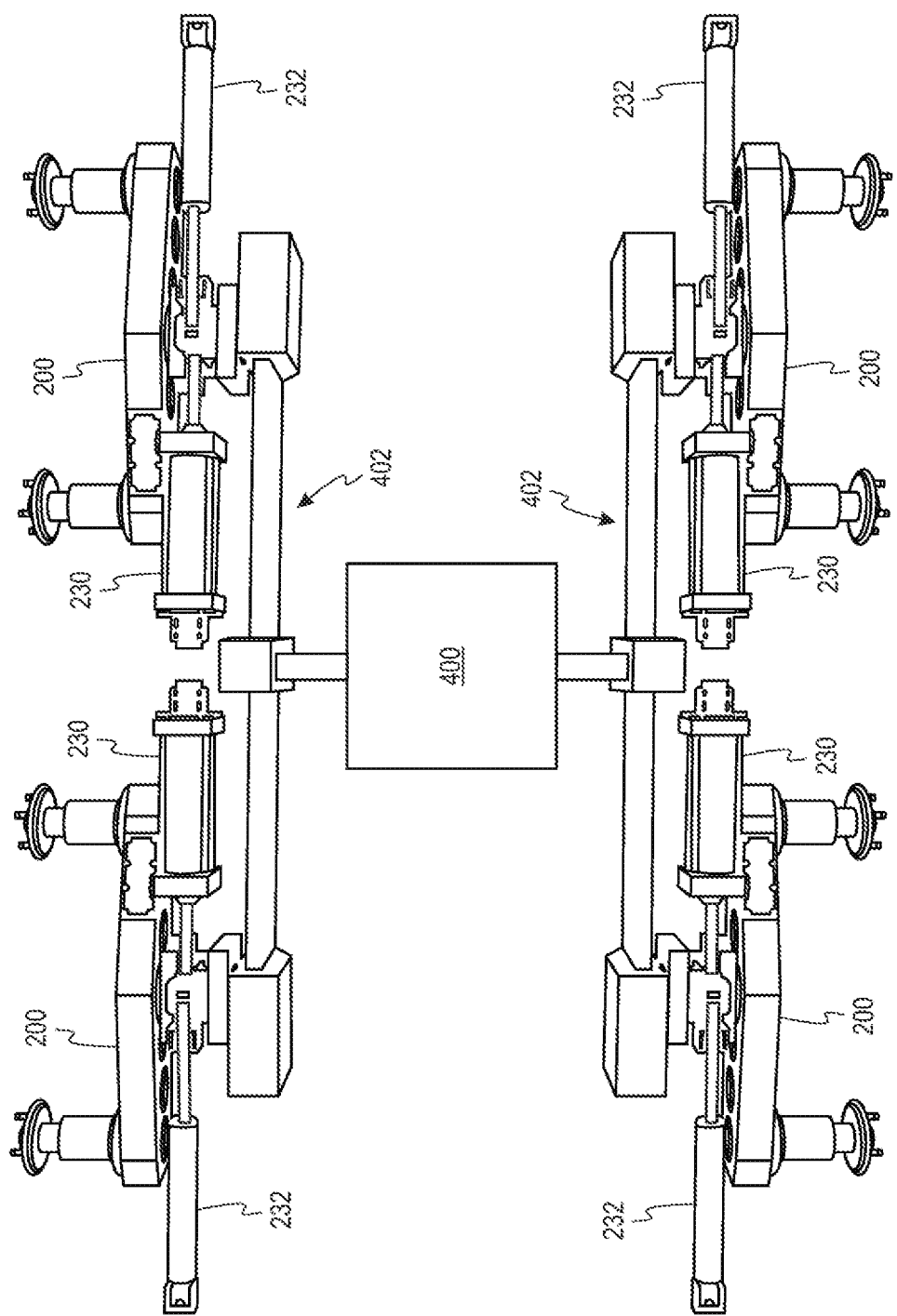
FIG. 4 shows a schematic of the vehicle in FIGS. 3A-3G according to aspects of the present disclosure.

FIG. 4 shows a schematic of the internals of the vehicle 300, including the gear arm assemblies 200. Also included are a power source 400 and a drivetrain 402. The power source 400 can be any source of mechanical, pneumatic, hydraulic, and/or electric power that can be converted into a rotational movement to rotate the primary drive shafts 118 of the gear arm assemblies 200. In one or more embodiments, the power source 400 can be a hydraulic or a pneumatic power source, such as a combustion and/or electric motor that generates hydraulic or pneumatic power in the form of hydraulic or air pressure. In one or more embodiments, the power source 400 can be a combustion engine that generates mechanical power that directly rotates the primary drive shafts 118. In one or more embodiments, the power source 400 can be an electric motor that generates mechanical power that directly rotates the primary drive shafts 118. However, regardless of the specific type of the power source 400, the power source 400 causes the wheels 304 to rotate to move the vehicle.

The drivetrain 402 connects the power source 400 to the primary drive shafts 118 of the gear arm assemblies 200. The drivetrain 402 can be any assembly that can translate the power from the power source 400 into the rotational movement of the primary drive shafts 118. In one or more embodiments, the drivetrain 402 can be one or more pneumatic or hydraulic lines and one or more pneumatic or hydraulic motors. The pneumatic or hydraulic lines transfer the pressure (e.g., air or hydraulic pressure) from the power source 400 to the one or more pneumatic or hydraulic motors. The one or more pneumatic or hydraulic motors then convert the pressure into rotational movement of the primary drive shaft 118 to power the gear arm assemblies 200. For example, each one of the primary drive shafts 118 for each one of the assemblies 200 can be connected to a separate hydraulic motor that converts the hydraulic pressure distributed by the drivetrain 402 from the power source 400 into rotational movement of the primary drive shafts 118. In one or more embodiments, the power source 400 can also power the cylinders 230 to rotate the arms 102. Alternatively, the vehicle 300 can include one or more additional assemblies to provide the power to drive the cylinders 230, such as one or more additional hydraulic and/or pneumatic assemblies to power the hydraulic and/or pneumatic cylinders 230.

The gear arm assembly of the present disclosure can be applied to any type of vehicle that traverses the ground. Thus, although described primarily has being applied to an 8-by-8 vehicle, the gear arm assembly of the present disclosure can be applied to a vehicle with more or less than eight wheels, such as a six-wheeled vehicle, a 10-wheeled vehicle, a 12-wheeled vehicle, etc. Further, although disclosed primarily herein as wheels being attached to the gear arm assembly, treads, tracks, and the like can instead be attached to the gear arm assembly. For example, the wheel hubs can be replaced by one or more components to allow tracks to be attached to the gear arm assembly, depending on the type of terrain the vehicle is primarily going to be driven on.

Although the vehicle described herein is primarily described as traversing the ground, in one or more embodiments, the vehicle can be an amphibious vehicle and can be configured to transition and operate on both land and sea. The frame of the vehicle can be water tight to allow the vehicle to float. The wheels connected to the gear arm assembly can also power the vehicle on the water.

The present disclosure is susceptible to various modifications and alternative forms, and some representative embodiments have been shown by way of example in the drawings and will be described in detail herein. It should be understood, however, that the inventive aspects are not limited to the particular forms illustrated in the drawings. Rather, the disclosure is to cover all modifications, equivalents, combinations, and alternatives falling within the spirit and scope of the invention as defined by the appended claims.

What is claimed is:

1. A gear arm assembly for a vehicle comprising:
   a gear arm housing having a first end, a second end, and an intermediate portion, the gear arm housing from the intermediate portion to the first end defining a first arm segment, and the gear arm housing from the intermediate portion to the second end defining a second arm segment;
   a plurality of gears meshed together in series and housed within the gear arm housing, the plurality of gears including an intermediate gear within the intermediate portion of the gear arm housing;
   a first wheel hub connected to a first gear of the plurality of gears at the first end of the gear arm housing;
   a second wheel hub connected to a second gear of the plurality of gears at the second end of the gear arm housing;
   a primary drive shaft extending into the gear arm housing at the intermediate portion and configured to connect a drive input of the vehicle to the intermediate gear;
   a spindle housing configured to connect the gear arm assembly to a frame of the vehicle;
   a spindle rotatably coupled to and within the spindle housing and configured to allow for rotation of the gear arm housing relative to the spindle housing;
   a stabilizer arm connected to and extending up from the spindle;
   a shock absorber connected to a distal end of the stabilizer arm opposite from the gear arm housing; and
   a pneumatic cylinder connected to the distal end of the stabilizer arm, the pneumatic cylinder being configured to cause the gear arm housing to rotate relative to the spindle housing upon actuation.

2. The assembly of claim 1, wherein the spindle housing comprises a first plate and a second plate separated by a surface, and the spindle extends through the first plate and the second plate and is seated within the surface.

3. The assembly of claim 1, wherein the first gear and the second gear rotate in an opposite direction as the intermediate gear in response input from the drive input through the primary drive shaft.

4. The assembly of claim 1, further comprising:
   a first half shaft connected to and between the first wheel hub and the first gear; and
   a second half shaft connected to and between the second wheel hub and the second gear.

5. The assembly of claim 4, wherein lengths of the first half shaft and the second half shaft provide clearance for wheels connected to the gear arm assembly at the first half shaft and the second half shaft.

6. The assembly of claim 1, wherein the pneumatic cylinder and the shock absorber extend away from each other connected to the distal end of the stabilizer arm, wherein an end of the shock absorber opposite from the stabilizer arm is connected to the frame of the vehicle, and wherein an end of the pneumatic cylinder opposite from the stabilizer arm is connected to the frame of the vehicle.

7. The assembly of claim 1, wherein the gear arm housing is formed from a single monolithic piece of metal or metal alloy.

8. A vehicle comprising:
   a frame;
   at least one power source mounted to the frame;
   a drivetrain mounted to the frame and connected to the at least one power source;

at least four gear arm assemblies mounted to the frame and connected to the drivetrain, each gear arm assembly of the at least four gear arm assemblies comprising:
  a gear arm housing having a first end, a second end, and an intermediate portion, the gear arm housing from the intermediate portion to the first end defining a first arm segment, and the gear arm housing from the intermediate portion to the second end defining a second arm segment;
  a plurality of gears meshed together in series and housed within the gear arm housing, the plurality of gears including an intermediate gear within the intermediate portion of the gear arm housing;
  a first wheel hub connected to a first gear of the plurality of gears at the first end of the gear arm housing;
  a second wheel hub connected to a second gear of the plurality of gears at the second end of the gear arm housing;
  a primary drive shaft extending into the gear arm housing at the intermediate portion and configured to connect the drivetrain to the intermediate gear;
  a spindle housing configured to connect the gear arm assembly to the frame; and
  a spindle rotatably coupled to and within the spindle housing and configured to allow for rotation of the gear arm housing relative to the spindle housing;
a plurality of wheels, each wheel of the plurality of wheels being connected to the first wheel hub or the second wheel hub of a separate one of the at least four gear arm assemblies,
wherein the drivetrain is configured to drive the plurality of wheels of the gear arm assemblies of the at least four gear arm assemblies on a first side of the vehicle independently from the wheels of the gear arm assemblies of the at least four gear arm assemblies on a second side of the vehicle, opposite from the first side.

9. The vehicle of claim 8, for each gear arm assembly of the at least four gear arm assemblies, further comprising:
  a stabilizer arm connected to and extending up from the spindle; and
  a pneumatic cylinder connected to the distal end of the stabilizer arm, the pneumatic cylinder being configured to cause the gear arm housing to rotate relative to the spindle housing upon actuation.

10. The vehicle of claim 8, for each gear arm assembly of the at least four gear arm assemblies, wherein a gear ratio of the intermediate gear and the first gear is 1:1, and a gear ratio of the intermediate gear and the second gear is 1:1.

11. The vehicle of claim 8, for each gear arm assembly of the at least four gear arm assemblies, wherein the plurality of gears are seven gears and the intermediate gear is the middle gear.

12. The vehicle of claim 11, for each gear arm assembly of the at least four gear arm assemblies, wherein the gear ratio for each pair of adjacent gears of the seven gears is 1:1.

13. The vehicle of claim 8, wherein the at least one power source comprises a hydraulic-pressure source, and the drivetrain comprises a separate hydraulic motor connected to the primary drive shaft of a separate gear arm assembly of the at least four gear arm assemblies.

14. The vehicle of claim 13, wherein the drivetrain includes compressed-air lines connecting the at least one power source to pneumatic motors.

15. The vehicle of claim 8, wherein the at least one power source is a combustion engine, and the drivetrain includes one or more axles and one or more differential gearboxes connecting output of the combustion engine to each primary drive shaft of the at least four gear arm assemblies.

16. A gear arm assembly for a vehicle comprising:
  a gear arm housing having a first end, a second end, and an intermediate portion, the gear arm housing from the intermediate portion to the first end defining a first arm segment, and the gear arm housing from the intermediate portion to the second end defining a second arm segment;
  a plurality of gears meshed together in series and housed within the gear arm housing, the plurality of gears including an intermediate gear within the intermediate portion of the gear arm housing;
  a first wheel hub connected to a first gear of the plurality of gears at the first end of the gear arm housing;
  a second wheel hub connected to a second gear of the plurality of gears at the second end of the gear arm housing;
  a primary drive shaft extending into the gear arm housing at the intermediate portion and configured to connect a drive input to the intermediate gear;
  a spindle housing configured to connect the gear arm assembly to the vehicle; and
  a spindle rotatably coupled to and within the spindle housing and configured to allow for rotation of the gear arm housing relative to the spindle housing.

17. The assembly of claim 16, further comprising a stabilizer arm connected to and extending up from the spindle.

18. The assembly of claim 17, further comprising a shock absorber connected to a distal end of the stabilizer arm opposite from the gear arm housing.

19. The assembly of claim 17, further comprising a pneumatic cylinder connected to the distal end of the stabilizer arm, the pneumatic cylinder being configured to cause the gear arm housing to rotate relative to the spindle housing upon actuation.

20. The assembly of claim 16, wherein an angle formed between the first arm segment and the second arm segment is about 160°.

* * * * *